March 1, 1960 R. SOMMER 2,926,571
PHOTOGRAPHIC CAMERA PROVIDED WITH A SHUTTER AND DIAPHRAGM
Filed May 26, 1958 3 Sheets-Sheet 1

INVENTOR
RICHARD SOMMER
BY
Mock+Blum
ATTORNEYS

INVENTOR
RICHARD SOMMER

March 1, 1960 R. SOMMER 2,926,571
PHOTOGRAPHIC CAMERA PROVIDED WITH A SHUTTER AND DIAPHRAGM
Filed May 26, 1958 3 Sheets-Sheet 3

INVENTOR
RICHARD SOMMER
BY Mocker Blum
ATTORNEYS

United States Patent Office 2,926,571
Patented Mar. 1, 1960

2,926,571

PHOTOGRAPHIC CAMERA PROVIDED WITH A SHUTTER AND DIAPHRAGM

Richard Sommer, Braunschweig, Germany, assignor to Voigtländer A.G., Braunschweig, Germany, a corporation of Germany Application May 26, 1958, Serial No. 737,601

Claims priority, application Germany July 13, 1957

8 Claims. (Cl. 95—10)

This invention relates to a photographic camera provided with a shutter and a diaphragm and it has particular relation to cameras having a diaphragm which can be adjusted by means of two diaphragm adjusters, one of which is coupled with a shutter time adjusting member in the sense of light value adjustment, while the other adjuster can be freely adjusted by hand. In using this construction, the adjustment of an exposure value and the subsequent selection of a shutter time + diaphragm value combination can be effected in simple manner. One of the diaphragm adjusters is adjustable according to a scale of exposure values so that upon adjustment of an exposure value the diaphragm is adjusted to a value which, together with the shutter time value adjusted in the respective case, yields the combination corresponding to said exposure value. If then subsequently the shutter time adjusting member is adjusted to a value corresponding to the picture taking conditions, due to the coupling providing with the other diaphragm adjuster, the diaphragm will be adjusted in conformity with the exposure value. Thus, the diaphragm value changes upon displacement of the handle connected with the free diaphragm adjuster, as well as upon displacement of the shutter time adjusting handle.

A known adjusting device of this type is mounted by the casing of a central shutter. In this device correct adjustment for a contemplated photographic picture, must be carried out on the basis of experience, or with the aid of suitable tables, or in conformity with the indication of a separate exposure meter.

According to the present invention, in a camera of the above mentioned type the free diaphragm adjuster is connected with means, by which a follow up mark can be adjusted to the pointer deflection of an electric exposure meter built-in in the camera and, in addition, the adjusting device can be subjected to preliminary adjustment with regard to fixed factors of picture taking, e.g. film sensitivity, filters and the like. In this manner adjustment in a simple manner, of correct values of exposure time and diaphragm opening will be available, whereby the film sensitivity value and filter factors, if any, are taken into consideration.

It has been found to be of advantage to connect the control member for displacement of the follow up mark mechanism over a releasable coupling with the free diaphragm adjuster. This control member and the free diaphragm adjuster are arranged displaceably relative to each other. The releasable coupling between the control member for the follow up mark mechanism and the free diaphragm adjusted is preferably arranged between the adjusting handles connected with said members. These handles are displaceably arranged relative to each other in accordance with a scale of film sensitivity values, connected with one of the handles and a reading mark connected with the other of the handles. According to an advantageous arrangement, a cam ring which controls the follow up mark mechanism and is connected with one of the handles, and the other of the two handles, may be the carriers of the scale arrangement for bringing about adjustment of film sensitivity. In order to attain this, the adjusting ring connected with the free diaphragm adjuster can be designed in such a manner that it overlaps the outer peripheral surface of the cam ring. Through a window provided for in this ring, a scale of film sensitivity values located on the outer peripheral surface of the cam ring, but only the value adjusted in the respective case, can be seen. The cam may also carry at each of two locations which are staggered relative to each other, scales, one of which is calibrated in DIN and the other in ASA values, so that through two suitably arranged windows the DIN-value and the corresponding ASA value can be seen.

In order to provide for the possibility of taking into consideration also constant values other than the film sensitivity value, e.g. filter values, it is of advantage to displaceably arrange that part of the adjusting device which is connected with the free diaphragm adjuster, as a structural unit relative to a fixed adjusting scale or adjusting mark.

The appended drawings illustrate a specific embodiment of and best mode for carrying out the invention, to which the invention is not limited.

Figure 1:
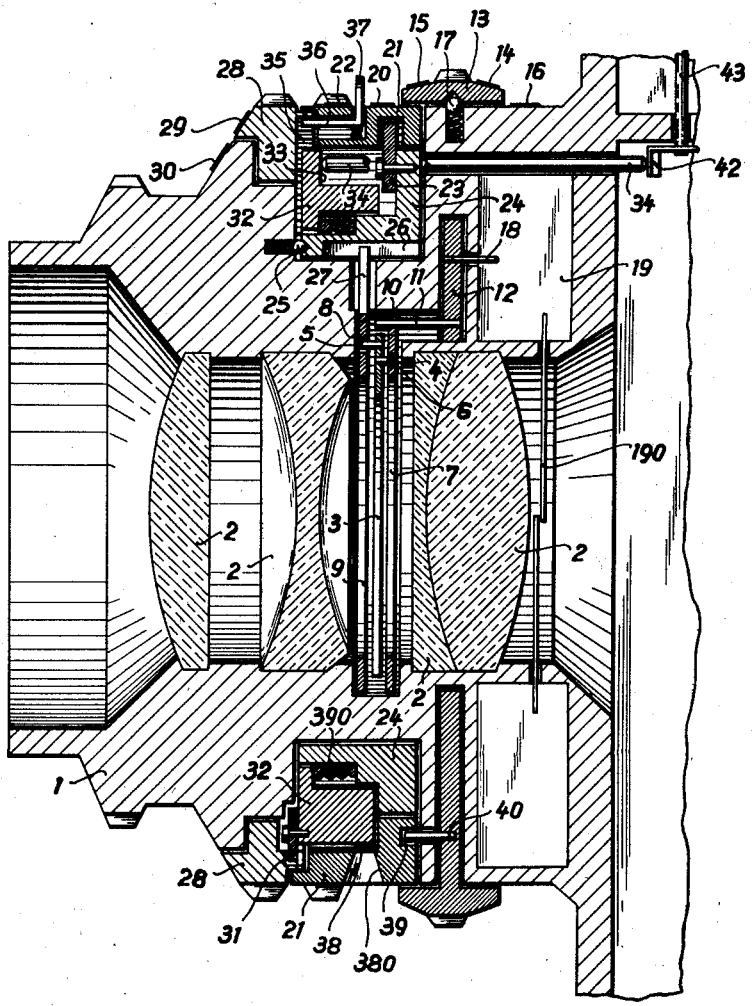
Figure 1 is a lateral view in section of an objective mount provided with a device according to the invention.

Referring now to the drawings in detail, the objective mount body which contains the adjusting device according to the present invention and forms a structural unit with the casing of the central shutter, is denoted 1 in the drawings. It can be seen in Fig. 1 that lenses 2 forming the picture taking objective are held in said objective mount body and an iris diaphragm is located between said lenses. For the sake of clarity only a single diaphragm lamella 3 is shown in Fig. 1. Seated in this lamella is a bearing pin 4 and a control pin 5. The bearing pin 4 is seated in a bore 6 of diaphragm ring 7 and control pin 5 engages a control groove 8 of slotted diaphragm ring 9. Upon turning ring 9 relative to ring 7, diaphragm lamellae 3 are caused to move, in a manner known by itself from the art.

While in conventional iris diaphragms the diaphragm ring, which forms the bearing for the lamellae of the diaphragm, is fixedly seated in the mount body, and the diaphragm ring carrying the control grooves is displaceable relative to the same, in the adjusting device according to the present invention an iris diaphragm is used in which the diaphragm ring, in which the lamellae are pivoted, is likewise displaceable. In such iris diaphragms, which have been known by themselves, the diaphragm opening can be adjusted by turning the slotted diaphragm ring relative to the diaphragm ring as well as vice versa. If these two rings are simultaneously turned in the same direction of rotation, there will be no change of the adjusted diaphragm opening.

Fig. 1 also shows that, contrary to conventional arrangement, diaphragm ring 7 is not fixedly arranged in objective mount body 1, but, displaceably rests in the latter. This diaphragm ring 7 is provided with a flap 10. Seated in the latter is a coupling pin 11, the other end of which engages a shutter time adjusting ring 12, the knurled, ring-shaped adjusting handle of which is denoted 13. The latter is provided with two adjusting marks 14 and 15, which can be united to a single mark line, if desired. Mark 14 cooperates with a shutter time scale 16, which is stationary in the casing. By a stop device 17, shutter time adjusting ring 12 is arrested in its adjusted position. Therefore, it requires a certain amount of force to adjust said ring 12 to another shutter time value. The pin 18 indicates the operative connection between shutter time adjusting ring 12 and the driving mechanism 19 for the shutter which is not shown in detail but can be carried out in conventional manner, for instance as drawn and described in the U.S. Patent 2,492,723. The shutter sectors driven by mechanism 19 are denoted 190.

Thus, due to the permanent coupling between diaphragm 7 and shutter time adjusting ring 12, upon any change of the shutter time adjustment the diaphragm opening will be also adjusted. The adjusting members are thereby tuned to each other in such a manner that upon adjustment of the shutter time from one time value to another time value of half of its duration, e.g. from 1/30 second to 1/60 second, the diaphragm is opened by one adjusting value, e.g. from diaphragm value "11" to diaphragm value "8." Thus, the iris diaphragm is fixedly coupled with the shutter time adjusting member in the sense of the known exposure value adjustment.

The diaphragm value adjusted in each case can be read relative to the adjusting mark 15 of the shutter time adjusting ring 12, 13, because mark 15 cooperates with a diaphragm scale 20. The latter is located on a diaphragm adjusting ring 21, which is rotatably arranged on objective mount body 1 and is provided with a knurled rim 22. Diaphragm adjusting ring 21 is adjustably connected by means of a coupling member 23 with a diaphragm control ring 24, which is under the effect of a stop device 25 engaging one of its front surfaces. A pin-shaped flap 27 of diaphragm slot ring 9 engages an axially extending groove 26 of diaphragm control ring 24. Thus, ring 9 can be displaced by turning diaphragm adjusting ring 21. Thereby, diaphragm scale 20 located on the latter is displaced relative to mark 15 of shutter time adjusting ring 12, 13, so that the diaphragm value adjusted in this manner can be read here too. Due to the effect of stop device 25, the diaphragm value adjusted in each case will be slightly arrested. The arresting effect can be finely regulated so that there are arresting points not only at the adjusting points for the diaphragm values, but also between them.

As already mentioned above, upon adjustment of the diaphragm by movement of the shutter time adjusting ring 12, 13, the exposure value determined by the shutter time factor and the factor of diaphragm opening, does not change. However, the exposure value is changed when the diaphragm is adjusted by turning diaphragm adjusting ring 21, because there is no corresponding simultaneous movement of shutter time adjusting ring 12, 13, in this case.

Also arranged in objective mount body 1 is a rotatable setting or adjusting ring 28. This ring carries an adjusting scale 29 which contains several scale divisions and is adjustable relative to a mark 30 fixedly seated on objective mount body 1.

It can be seen in the lower part of Fig. 1 that said adjusting ring 28 is coupled, over an adjustable coupling member 31, with a cam ring 32. This ring 32 is provided—as can be best seen in the perspective illustration in Fig. 2—with a control cam 33, which extends in its axial direction and against which—as shown in the upper part of Fig. 1—a control pin 34 lies. This control pin 34 is displaceably arranged parallel to the optical axis of the picture taking objective, in objective mount body 1. It forms—as can be best seen in Fig. 4—the connecting means between control cam 33 and a mechanism to be described in more detail further below, by which a follow up mark can be adjusted to the pointer deflection of an electric exposure meter built-in in the camera body.

Figure 2:
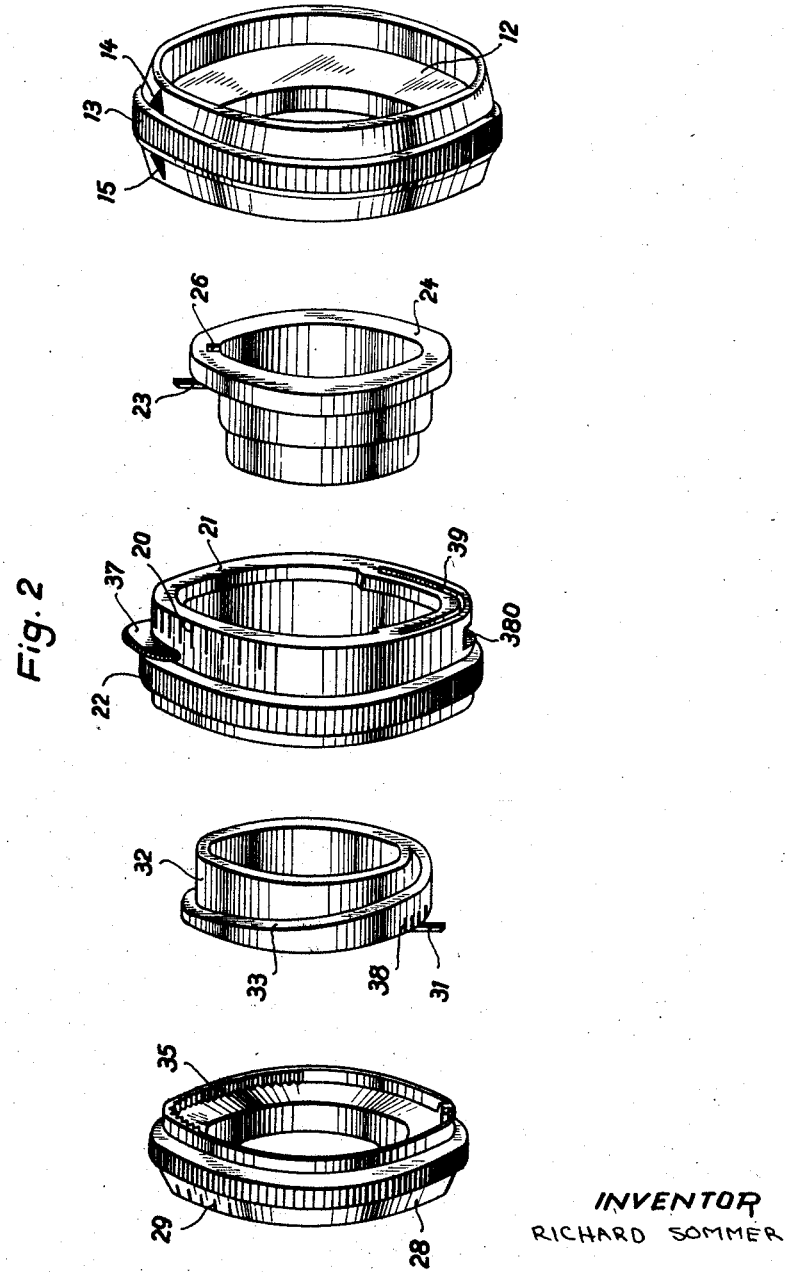
Fig. 2 is a perspective view of some of the parts shown in Fig. 1.

As shown in the upper part of Fig. 1 and in the perspective illustration in Fig. 2, adjusting ring 28 is provided with a coupling toothing 35, which is engaged under spring effect by a coupling arm 36 pivoted in diaphragm adjusting ring 21. Thereby, adjusting or setting ring 28 and diaphragm adjusting ring 21 are coupled with each other. This coupling can be released by exerting pressure, contrary to the spring effect, on handle 37 projecting from diaphragm adjusting ring 21, whereby coupling arm 36 is brought out of engagement with said coupling toothing 35 and is held in this position. Setting ring 28 and diaphragm adjusting ring 21 can be then displaced relative to each other.

Such a displacement may be carried out for example for adjustment to film sensitivity values. Cam ring 32, which is connected with adjusting ring 28, carries—as can be seen from the lower part of Fig. 1 and from Fig. 2—on its outer peripheral surface which is gripped around by diaphragm adjusting ring 21, a scale 38 of film sensitivity values, of which the value adjusted in the respective case can be read through a window 380 provided in ring 21.

Furthermore, the diaphragm adjusting ring 21 is provided, in its front surface turned toward the shutter time adjusting ring 12, with a recess 39, which extends parallel to its peripheral surface, as shown in the lower part of Fig. 1 and particularly in Fig. 2. This recess 39 is engaged with play by a follower pin 40, which is fixedly seated in shutter time adjusting ring 12, as shown in the lower part of Fig. 1. Said pin 40 comes in contact with diaphragm adjusting ring 21 only at both lateral border edges of recess 39. It is then—as will be described in more detail further below—a coupling member between shutter time adjusting ring 12 and diaphragm adjusting ring 21.

A pressure spring 390, which lies against diaphragm control ring 24 and cam ring 32, holds the latter in engagement, without play, with a counter surface of objective mount body 1, so that control pin 34, which lies against control cam 33, can carry out only the axial displacement determined by the ascent of control cam 33.

As already mentioned above, control pin 34 is the connecting means between control cam 33 and a mechanism which is arranged in the camera body and by which a follow up mark can be adjusted to the position, in each case, of the pointer of an electric exposure meter.

Figure 3:
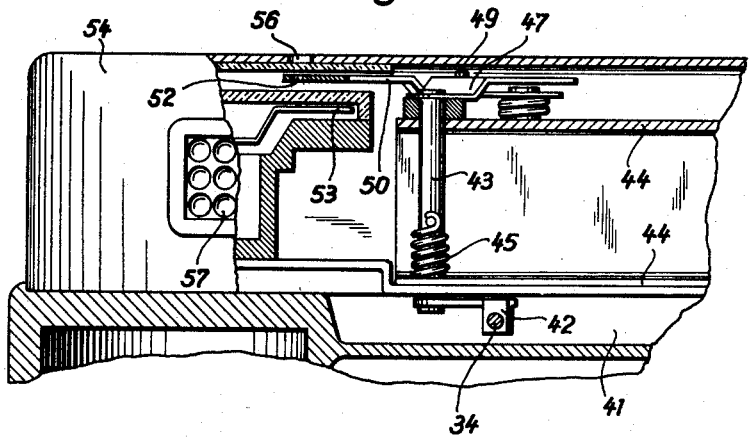
Fig. 3 illustrates part of a broken up camera casing and shows part of a follow up mechanism.
Figure 4:
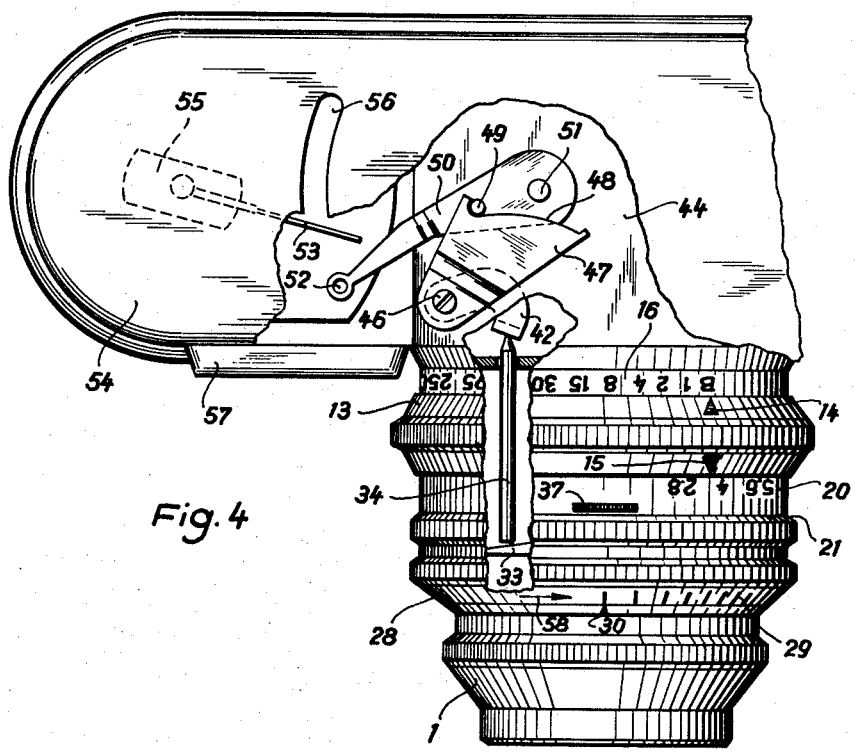
Fig. 4 illustrates the follow up mark mechanism in plan view of a partially broken up camera casing and an objective mount.

The details of this mechanism are shown in Figures 3 and 4. As shown in Fig. 4, control pin 34 projects, with its end turned away from control cam 33, into camera casing 41 and lies there against a control arm 42, seated on a shaft 43. The latter has its bearings in partitions 44 of camera casing 41 and is under the effect of a torsion spring 45, as shown in Fig. 3. Under the effect of this spring 45, control arm 42 always tends to hold control pin 34 in engagement with control cam 33. Fastened to shaft 43 by means of a screw 46 is a tiltable plate 47, against the edge 48 (see Fig. 4) of which a pin 49 lies. This pin 49 is seated on a lever 50, which is tiltably pivoted about pin 51 and is under the effect of a spring (see Fig. 3) in such a manner that the pin 49 is urged to permanently lie against edge 48. The free end of lever 50 carries a follow-up mark 52, which projects into the range of movement of the pointer 53 of an electric exposure meter 55, which is built-in in camera cap 54. Provided in camera cap 54 is a window 56 which extends in the path of movement of follow-up mark 52 and pointer 53 of the exposure meter and follow-up mark 52 can be observed through said window 56. The light-sensitive cell which supplies the measuring current is applied to the camera cap 54 and denoted 57.

As shown in Figs. 3 and 4, pin 51, about which lever 50 carrying the follow-up mark 52, is tiltably arranged is located beyond the circle described by the point of exposure meter pointer 53. This arrangement of follow-up mark 52 relative to pointer 53 has considerable advantages, because in this manner almost linear tilting paths of the follow-up mark 52 will compare with deflections of the pointer 53, which are non-linear, particularly in the end portions of the deflection range. The follow-up mark 52 comes to superposition with the point of pointer 53 only in both end positions of said pointer, while in intermediate positions it will come to superposition with various points of the pointer body. In the end portions of the deflection range of pointer 53, small movements of the pointer call then for larger movements of the follow-up mark 52 and the latter do not essentially change when the mark 52 follows up larger movements in the middle portion of the deflection range of pointer 53.

The above described adjusting device operates in the following manner:

First, it is necessary to adjust the device to the sensitivity value of the film inserted in the camera.

As pointed out above, this is done by turning—after release of the coupling 35, 36, 37—setting ring 28 and diaphragm adjusting ring 21 relative to each other until in recess 380 of diaphragm adjusting ring 21 the correct film sensitivity value of scale 38 appears. If in this adjustment only the diaphragm adjusting ring 21, and thereby together with it the diaphragm slot ring 9, is turned, a preliminary adjustment of the iris diaphragm, in which the film sensitivity has been taken into consideration, is obtained. If, however, in this adjustment only adjusting ring 28, and thereby together with it cam ring 32, is turned, a corresponding preliminary adjustment of the follow-up mark 52, with consideration of the film sensitivity, is obtained. Upon simultaneously turning both rings 21 and 28 relative to each other, a corresponding preliminary adjustment of the iris diaphragm and also of the follow-up mark 52 results.

After adjustment of the film sensitivity value, by releasing handle 37 the coupling between adjustment ring 28 and diaphragm adjusting ring 21 is automatically restored.

Prior to a contemplated photographic picture taking, the camera is held in such a manner that the light coming from the scene of picture taking will be incident on cell 57 whereupon pointer 53 of the exposure meter will show a deflection up to a definite position. The follow-up mark 52 must then be brought to superposition with pointer 53.

This is done by simultaneously turning setting ring 28 and diaphragm adjusting ring 21, permitted by coupling 35, 36, provided between these two rings. In order to relieve this coupling, the same diameter and design is given to the knurled rims of both rings 21 and 28, so that they can be conveniently gripped simultaneously and displaced jointly. Thereby, from setting ring 28, over coupling member 31, cam ring 32 is also moved, whereby control pin 34 is displaced. In this manner the latter causes tilting of control arm 42, whereby similarly tiltable plate 47 and by the latter lever 50 are tilted until follow-up mark 52 comes to superposition with the pointer 53 of the exposure meter. However, simultaneously, from diaphragm adjusting ring 21, over diaphragm control ring 24, diaphragm slot ring 9 and thus also the iris diaphragm proper have been displaced. When the follow up mark 52 and pointer 53 of the exposure meter are in superposition, the iris diaphragm will be adjusted to the value, which, together with the shutter time value adjusted in the respective case, represents the exposure value corresponding to the light conditions available in the respective case. Thereby it should be assumed that prior to the operation of rings 21 and 28 the shutter time adjusting rings 12, 13 was incidentally adjusted to a value which together with a now adjusted diaphragm value could yield the correct exposure value.

If, however, due to a preceding picture taking, the shutter time adjusting ring 12, 13, is adjusted e.g. to the shortest shutter time and in the picture taking now contemplated there is considerably less light available so that said shortest shutter time does not yield, even in combination with the largest diaphragm opening, the necessary exposure value, then the following happens:

Upon simultaneously turning rings 21 and 28, which are coupled with each other, in order to cause following-up of mark 52, to the position of pointer 53, the diaphragm is first displaced in the sense of opening. However, upon reaching complete opening, follow-up mark 52 will not be yet in superposition with pointer 53. At this moment a lateral border edge of recess 39 in diaphragm adjusting ring 21 (see lower part of Fig. 1 and Fig. 2) reaches carrying pin 40 seated in shutter time adjusting ring 12, whereby a taking along connection between diaphragm adjusting ring 21 and shutter time adjusting ring 12 is established. This connection acts in the case of the example in such a manner that upon further rotation of rings 21 and 28, shutter time adjusting ring 12, 13 is also taken along and this occurs in the sense of adjustment to longer shutter time periods. Due to its being coupled at 11 with the diaphragm ring 7, the latter will likewise turn so that the iris diaphragm opened to its full value is turned as a complete structural unit, whereby the diaphragm opening proper is not changed. When the follow-up mark 52 comes to superposition with pointer 53, then the adjusted value of the largest diaphragm opening and the then adjusted shutter time value yield the exposure value corresponding to the available light conditions, whereby the film sensitivity value has also been taken into consideration.

If this adjusted combination of diaphragm value + shutter time value does not correspond to the requirements of the contemplated picture taking, this combination can be modified without change of the adjusted exposure value. In the example, the taking of a picture, e.g. with a longer shutter time than the adjusted shutter time would be possible. Therefore, when shutter time adjusting ring 12, 13, is displaced in the sense of longer periods of time, due to its coupling 11 with diaphragm ring 7 an adjustment corresponding to the exposure value, i.e. a closing of the iris diaphragm will take place. Thereby, the position of follow-up mark 52 is not changed, because cam ring 32 which would cause such a change stands still. Relative to the marks 14 and 15 of shutter time adjusting ring 13, on the scales 16 and 20 the values adjusted in each case for shutter time and diaphragm opening, can be read.

In the above described adjusting procedure it has been assumed that at the start of the operations the shutter time adjusting ring 12, 13 was adjusted to the shortest shutter time which—in combination with the largest diaphragm opening—has not represented a combination corresponding to the exposure value to be adjusted, yet. It is, by itself, not relevant which adjusted position the shutter time adjusting ring 12, 13 has at the start of a new adjustment of the device. The length of recess 39 in diaphragm adjusting ring 21 is selected in such a manner that the rings 21 and 28, irrespectivve of whether at the time of their adjustment the iris diaphram is fully opened or is closed to its smallest value, assume a coupled position with shutter time adjusting value 12, 13 and either the one or the other of the lateral border edges of recess 39 will be in engagement with carrier pin 40.

Thus, in the adjusting device according to the present invention turning of the diaphragm adjusting ring 21 and of the setting ring 28 coupled with it, will bring about following up of mark 52 to the deflection of the exposure meter pointer and the simultaneous adjustment of a combination in conformity with the exposure value, of diaphragm value and shutter time value, whereby the diaphragm lamellae 3 are moved from one side i.e. from diaphragm slot ring 9. Due to the subsequently possible adjustment of shutter time adjusting ring 12, 13, within the previously adjusted exposure value, any other possible combination of diaphragm value and shutter time value can be adjusted, whereby the diaphragm lamellae 3 will be moved from the other side, i.e. from diaphragm ring 7. The sensitivity value of the film material used is thereby taken into consideration.

Consideration of light-weakening means, e.g. filters which are inserted in the path of picture taking rays is carried out with the aid of scale 29 provided on setting ring 28 and mark 30 seated on mount body 1. A displacement of the setting ring 28 in the direction of the arrow 58 provided thereon (see Fig. 4) from one adjusting division of scale 29 to the other, corresponds to a consideration of the filter factor "1." Thus, if for example in taking a photographic picture a filter with the filter factor "2" is used, then—after in the above described manner the follow-up mark 52 has been brought to superposition with pointer 53—setting ring 28 and ring 21 coupled therewith must be additionally displaced in the direction of arrow 58 by two divisions of the scale 29. By this displacement, the iris diaphragm will be opened by the action of ring 9 correspondingly. In this manner a definite combination of diaphragm value and shutter time value is adjusted, which corresponds to the exposure value adjusted in conformity with the deflection of pointer 53, modified by the filter factor "2." Thus, as explained above, a combination of diaphragm value and shutter time value which meets the requirement of the contemplated picture taking, can be selected by corresponding displacement of the shutter time adjusting ring 12, 13 without affecting the adjusted exposure value modified by the filter factor "2."

In this adjustment of the filter factors, the follow up mark 52, which was previously in superposition with pointer 53, is displaced again, because upon turning rings 21 and 28 for displacement of scale 29, cam ring 32 was also moved. Thus, although in this photographic picture taking follow up mark 52 and pointer 53 are not in superposition, correct values for diaphragm and shutter time are adjusted in conformity with the picture taking conditions.

A displacement of adjusting rings 21 and 28 for taking into consideration filter factors, is automatically canceled by a subsequent displacement of these two rings if the follow up mark 52 is brought again to superposition with pointer 53.

In the selection of diaphragm values and shutter time values, which can be effected after each adjustment of the exposure value by turning shutter time adjusting ring 12, 13, it may happen that in the course of this adjustment the diaphragm reaches its highest or smallest adjustment value. Movement of the adjusting mark 15 along diaphragm scale 20 permits the observation of the diaphragm value adjusted in each case. However, it can be overlooked that one of the two terminal values of the iris diaphragm has been reached. In this case, carrier bolt or pin 40 (see lower part of Fig. 1) comes in engagement with one of the two lateral border edges of recess 39 in diaphragm adjusting ring 21. As the latter is fixedly connected with diaphragm control ring 24, which is under the effect of stop device 25, further turning of shutter time adjusting ring 12, 13 will meet with a perceptibly stronger resistance. This indicates to the operator that the iris diaphragm has reached one of its terminal positions.

In itself, when the iris diaphragm has reached one of its end positions, upon further turning of shutter time adjusting ring 12, 13 a total displacement of the fully opened diaphragm or of the diaphragm closed to its smallest opening would be possible, because carrier pin 40 takes them along rings 21 and 24, which are connected with diaphragm slot ring 9. Thereby, however, at equal adjustment of the diaphragm only the shutter time value would change, so that the adjusted exposure value would be displaced. But the distinctly perceptible increase of resistance to displacement of the shutter time adjusting ring 12, 13, represents a warning against such inadvertent defective adjustment.

In the example described above, on the shutter time adjusting ring 12, 13 two reading marks 14, 15 are arranged. These two marks can be united to a single mark, e.g. to a single mark line, whereby the ends of this line cooperate with scales 16 and 20. Furthermore, it is, of course equally possible to arrange the shutter time scale and also the diaphragm scale on the ring 12, 13 and to arrange the reading marks on the objective mount body and the diaphragm adjusting ring 21.

It will be understood from the above that this invention is not limited to the specific designs, constructions, arrangements, members and other details specifically described above and illustrated in the drawings and can be carried out with various modifications without departing from the scope of the invention as defined in the appended claims.

The sensitivity of films is expressed in figures in various systems of measurement. The example of this invention shows the application of only one system. In this case only one recess of diaphragm adjusting ring is arranged for indicating the adjusted film sensitivity value. Of course on different places of the cam ring there can be arranged also two scales of film sensitivity values, by example one scale according to the DIN system and the other scale according to the ASA system. The DIN values correspond to the German norm, the ASA values to the American one of sensitivity. The two scales and two corresponding recesses for adjusting the figures are arranged in such a form, that the setting of both windows shows the corresponding sensitivity of either system, i.e. if the DIN scale shows "18" the ASA scale shows "50."

What is claimed is:

1. A photographic camera comprising a picture taking objective and an objective mount body therefor, said body forming a structural unit with the casing of a central shutter; a shutter, shutter time adjusting means and means for operating the shutter; an iris diaphragm having lamellae and means for adjusting the diaphragm, a bearing pin and a control pin being seated in each of the diaphragm lamellae; an electric exposure meter built-in in the camera and having a pointer; a follow-up mark adapted to be adjusted to the deflections of said pointer; means for causing said mark to follow up deflections of said pointer; and means for the adjustment of picture taking conditions to constant picture taking factors; the means for adjusting the diaphragm and the shutter time including a diaphragm ring rotatably arranged in the objective mount body, said diaphragm ring having a bore adapted to receive said bearing pin seated in the lamella, and being provided with an attached flap having a coupling pin seated therein; a rotatable grooved diaphragm ring having a control groove adapted to be engaged by said control pin seated in the diaphragm lamella and being provided with a pin shaped extension; the diaphragm lamella being moved upon turning said diaphragm ring relative to said grooved diaphragm ring, as well as upon turning the grooved diaphragm ring relative to said diaphragm ring; a rotatable shutter time adjusting ring operatively connected with the means for operating the shutter and being fixedly engaged by the coupling pin seated in the flap of the diaphragm ring, whereby, due to this coupling, upon each change of the shutter time by displacement of the shutter time adjusting ring, the diaphragm opening is also changed, two marks being located on the rim of said shutter time adjusting ring, one of said marks cooperating with a stationary scale of shutter time values, provided on the camera casing and the other of said marks cooperating with a diaphragm scale; a stop device for acting on the shutter time adjusting ring in order to arrest this ring in its adjusted position; a diaphragm control ring and a diaphragm adjusting ring; said diaphragm control ring being connected by a coupling member with said diaphragm adjusting ring and having an axially extending groove adapted to be engaged by said pin-shaped extension of the grooved diaphragm ring in order to cause rotation of the grooved diaphragm ring upon turning the diaphragm adjusting ring; a stop device acting on the diaphragm control ring in order to arrest the diaphragm in the adjusted position; a setting ring rotatably arranged in the objective mount body carrying a scale which is adjustable relative to a stationary mark seated on the objective mount body; means for releasably coupling the setting ring with the diaphragm adjusting ring in order to permit simultaneous adjustment of the setting ring and diaphragm adjusting ring; a cam ring provided with a control cam extending in axial direction relative to said cam ring, said setting ring being adapted to be coupled with said cam ring over a coupling member; a control pin, which is displaceable parallel with the optical axis of the picture taking objective, lying against said control cam, in order to form a connecting means between this control cam and the means for causing adjustment of the follow-up mark to deflections of the pointer of the exposure meter.

2. A photographic camera as claimed in claim 1, in which the means for causing adjustment of the follow-up mark include a control arm which is seated on a shaft journalled in the camera casing and being under the effect of a torsion spring, said control arm being adapted to engage the end turned away from said control cam of said control pin lying against said control cam and to urge, under the effect of said torsion spring, said control pin to permanent engagement with said control cam; a pivotally arranged one-arm lever which carries a control pin, the follow-up mark being carried by said one-arm lever at its free end which projects into the path of movement of the exposure meter pointer; a tiltable control member fastened to said shaft and being provided with a cam edge adapted to be engaged by said control pin carried by the one-arm lever and thereby cause follow-up movement of the follow-up mark.

3. A photographic camera as claimed in claim 1, in which the means for releasably coupling the setting ring with the diaphragm adjusting ring include a coupling toothing provided in said setting ring, a coupling arm which is arranged in said diaphragm adjusting ring, is adapted to engage under spring effect said toothing and to be released from engagement with said toothing upon exerting pressure on said coupling arm against said spring effect.

4. A photographic camera as claimed in claim 3, in which the cam ring connected with the setting ring carries on its outer periphery a scale of film sensitivity values and the diaphragm adjusting ring is provided with a window for reading the adjusted film sensitivity value.

5. A photographic camera as claimed in claim 3, in which the diaphragm adjusting ring carries on its front surface turned toward the shutter time adjusting ring, a recess extending substantially parallel with its peripheral surface and the shutter time adjusting ring carries a drive pin adapted to engage the two lateral limiting edges of said recess and form a coupling member between said shutter time adjusting ring and diaphragm adjusting ring.

6. A photographic camera as claimed in claim 2, comprising a pressure spring arranged between the diaphragm control ring and the cam ring, in order to cause the latter to lie against an adjacent surface of the objective mount body, in order to limit axial movement of the control pin which lies against the control cam, to the axial displacement determined by the pitch of said control cam.

7. A photographic camera as claimed in claim 1, in which the cap of the camera is provided with a window, the design of which substantially corresponds to the path of movement of the follow-up mark.

8. A photographic camera as claimed in claim 2, in which the pivotal point of the lever carrying the follow-up mark is located outside the circular path described by the tip of the exposure meter pointer.

References Cited in the file of this patent

UNITED STATES PATENTS

| | | |
|---|---|---|
| 2,527,800 | Dorsey | Oct. 31, 1950 |
| 2,596,328 | Dorsey | May 13, 1952 |
| 2,849,936 | Fahlenberg | Sept. 2, 1958 |

FOREIGN PATENTS

| | | |
|---|---|---|
| 193,941 | Switzerland | Feb. 1, 1938 |
| 184,058 | Austria | Dec. 10, 1955 |
| 1,136,451 | France | Dec. 29, 1956 |